United States Patent [19]

Harsh et al.

[11] 4,386,579

[45] Jun. 7, 1983

[54] ANIMAL LITTER

[75] Inventors: Angie Harsh, Hagerstown, Md.; Benjamin M. Schulein, Jr., St. Louis, Mo.

[73] Assignee: Alfa-Pet, Inc., St. Louis, Mo.

[21] Appl. No.: 292,645

[22] Filed: Aug. 13, 1981

[51] Int. Cl.³ .............................................. A01K 1/015
[52] U.S. Cl. ....................................................... 119/1
[58] Field of Search ............................................ 119/1

[56] References Cited

U.S. PATENT DOCUMENTS

| | | | |
|---|---|---|---|
| 2,848,976 | 8/1958 | Combs | 119/1 |
| 3,636,927 | 1/1972 | Baum | 119/1 |
| 4,308,825 | 1/1982 | Stepanian | 119/1 |

Primary Examiner—Robert P. Swiatek
Attorney, Agent, or Firm—Kalish & Gilster

[57] ABSTRACT

An animal litter for absorbing and deodorizing animal waste material consisting of an absorbent soil and particulate cedar wherein the latter provides a discrete foundation for the soil, being in unbound, unmixed relationship thereto.

8 Claims, No Drawings

ANIMAL LITTER

BACKGROUND AND SUMMARY OF THE INVENTION

Absorbent soils, such as clays, exemplified by bentonite, fuller's earth, and various colloidal aluminum silicates, as well as diatomaceous earth, have been widely used as animal litter material, particularly in view of the relatively low cost thereof. However, such soils have certain recognized disadvantages. One critical drawback has been the recognition that such soils are not efficacious in controlling or suppressing the odor of waste material deposited thereon. To overcome this deficiency, efforts have been made to mix with the soil an odor suppressing agent as disclosed in U.S. Pat. No. 3,789,797. Therein a clay, such as bentonite, is intermixed with ground and screened alfalfa, being held together by a binder. Thereafter, the mixture is pelletized. The chlorophyll in the alfalfa is intended to provide odor control. A similar admixture is revealed in U.S. Pat. No. 3,735,734 wherein a deodorizing agent, such as chlorophyll and other compounds, is added to absorbent soil and mixed therein for uniform distribution. Thus, the attempts to the present time to provide deodorizing capability to a litter comprised fundamentally of a soil, such as clay, have entailed the integration of the deodorizing agent within the body of the clay and even to the extent of being bound therein.

However, these expedients have not proved efficient in practice for numerous reasons; one being that the odor suppressant as embodied within the clay does not exhibit its expected level of capability since for some reason a repression of this capacity develops as a result of admixing. Additionally, the same do not serve to inhibit in any fashion the recognized tendency of the clay to develop a muddy character upon use, nor to impede undesired caking. Thus, such mixtures do not eliminate adherence to the paws or fur of the animal with resultant untidy tracking throughout the area adjacent the litter, nor facilitate receptacle cleanliness because of caking.

Therefore, it is an object of the present invention to provide an expedient for potentiating or enhancing the capacity of absorbent soil, such as clay, to provide economically the range of characteristics desired in an animal litter and, thus, render such soils all the more attractive to purchasers for use as animal litters.

It is another object of the present invention to provide as a potentiating agent for absorbent soil-type litters consisting of cedar in particulate form for providing a discrete bed or foundation for the absorbent soil; with increased effective life of the soil and relatively enhanced odor inhibiting qualities.

It is a further object of the present invention to provide a litter potentiating agent for absorbent soil litters consisting of comminuted cedar which is utilized as a discrete base for the absorbent soil, being in unbound and unmixed relationship thereto so that the average purchaser may simply dispense a quantity of the preselected absorbent soil converingly over the cedar base for the formation of discrete, physically independent strata of absorbent soil and cedar, and without the necessity of any further action whatever.

It is another object of the present invention to provide an animal litter which consists of but only the preselected absorbent soil and comminuted or particulate cedar disposed to present distinct strata, with the absorbent soil in overlying or surmounting relationship to the cedar and being substantially of relatively greater thickness or depth.

It is a still further object of the present invention to provide a method for forming an animal litter by the individual purchaser which permits the utilization of inexpensive absorbent soil and particulate cedar; and which two constituents effectively inhibit caking of the soil while causing odor control to a degree well advanced beyond that expected with customary litter preparations involving soils.

It is another object of the present invention to provide an animal litter which may be most inexpensively prepared; which extends the life of the preselected absorbent soil; which increases the absorbency of the soil; and which is economical and reliable in usage.

DESCRIPTION OF THE INVENTION

In essence, this invention resides in the provision of cedar in particulate form for cooperation with an absorbent soil, such as, diatomaceous earth and clays, such as, bentonite, fuller's earth, and other porous colloidal clays; which soil and cedar are in unmixed, unbound relationship, being disposed in discrete layers with the clay surmounting or overlying, being supported upon the cedar stratum.

In order to prepare a litter in accordance with the present invention, the cedar, which is in comminuted or particulate form, is provided coveringly upon and throughout the entire base of the pan, tray, or other receptacle for the litter, to a depth of, preferably, within the range of $\frac{1}{4}''$ to $\frac{1}{2}''$. A greater depth is, of course, fully efficient, but such represents a needless waste, so that the thickness of the cedar should merely be no less than approximately $\frac{1}{4}''$. Such cedar has been cut, ground, or otherwise reduced so as to be within the range of a No. 2 to a No. 16 mesh. The middle zone of this range, as No. 4 to No. 8, is preferred, but the other sizes are definitely fully effective. It has been found that if the cedar is in large particle form, so as not to pass through the coarsest screen of the aforesaid mesh sizes, air pockets will develop within the formed cedar bed and such militates against the deodorizing as well as absorbency capacities of the cedar. The cedar should thus be relatively compact so that any air pockets are of minimal extent and, thus, not prone to adversely affect the functionality of the cedar. Therefore, the preferred range will substantially assure against the formation of the air pockets of undesired volume and present the cedar in adequate compactness for full acceptance of urine.

With the aforesaid cedar bed having been fully formed, there is then distributed thereon the preselected absorbent soil, such as clay or diatomaceous earth, in a completely covering relationship to the cedar and to a depth which preferably substantially exceeds that of the cedar. In actual practice, the customary amount of the said litter is disposed on the cedar foundation so that the user does not have any need to measure the quantity dispensed. The absorbent soil will have a preferred depth within the range of approximately $1\frac{1}{2}''$ to $3\frac{1}{2}''$.

It will be observed that the soil and the cedar thus form two distinct strata, and with there being no intermixing of the same or the utilization of any agents for binding one to the other.

Therefore, the preselected soil and the cedar, except for the suitable pre-comminution thereof, are in no way treated but simply disposed one on top of the other, with the soil desirably fully covering the cedar and the latter equally fully covering the associated receptacle bottom.

Thus, a purchaser who had already obtained a quantity of absorbent soil need only purchase the cedar and dispose same, as aforesaid, within the litter receptacle before discharging the soil thereon, so that such a user encounters no difficulty in forming the resultant arrangement.

In actual practice, it has been demonstrated that a litter formed in accordance with the present invention provides the requisite odor control or odor suppression by virtue of the waste material moving gravitationally through the layer of soil for absorption by the cedar, which absorbancy, in addition to effectively controlling the odor of the wastes, also serves to absorb such wastes and thus inhibits the development of any pools within the litter receptacle. By reason of the substantial passage of the waste material through the soil to the cedar, there is prevented the development of the usual mud with resultant caking that one has heretofore perforce accepted with the utilization of absorbent soils. The obviation of muddiness and attendant caking serves to prevent the adherence to the animal of the litter and thereby inhibits tracking in the surrounding areas which has been a serious drawback in the use of soils for litter purposes, as well as promoting easy cleaning of the litter tray or vessel through elimination of caking.

The coordination of the cedar and the soil in the manner hereinabove discussed has brought about a synergistic effect in that it has been established that the soils have been, in some way, potentiated from an absorbent standpoint and have, on average, enjoyed an increased life of about 30%, thereby materially offsetting the cost of the cedar.

Accordingly, in view of the foregoing, it will be seen that by resort to cedar in particulate form the usual said litters are markedly potentiated and thus may be used for relatively extended periods of time beyond that customarily enjoyed without the cedar foundation. Moreover, substantial elimination of odors is effected and to a degree unachievable by the admixture of an odor suppressant, such as alfalfa or other chlorophyll agent, within the particular soil. Experimentation has established beyond peradventure that such admixtures do not posses the odor suppressing competency of a litter wherein the cedar and the soil are in unbound, discrete strata. Furthermore, as pointed out above, the present invention obviates the usual formation of mud within the soil and effectively stops soil caking so that receptacle cleaning is facilitated.

What is claimed is:

1. An animal litter consisting essentially of a soil selected from the group consisting of diatomaceous earth and clay, and natural, untreated cedar, said soil and said cedar being in unmixed and unbound relationship and presented in discrete strata, said soil stratum being disposed upon said cedar stratum in substantially complete covering relationship thereto, said soil stratum being relatively thicker than said cedar stratum, the cedar is of such particulate character as to militate against the formation of air pockets therein.

2. An animal litter as defined in claim 1 wherein the depth of said soil stratum is within the range of approximately 1½" to 3½", and the depth of the cedar stratum is within the range of approximately ¼" to ½".

3. An animal litter as defined in claim 1 wherein the cedar is within a mesh size range of approximately 2 to 16.

4. For use with an animal litter comprising an absorbent soil selected from the group consisting of diatomaceous earth and clay, an agent for potentiating the effectiveness of said litter comprising natural, untreated cedar presented in stratum-forming condition and in underlying relationship to the soil, said cedar being in unbound and unmixed relationship with respect to the soil, and of such particulate character as to militate against the development of air pockets within the cedar stratum, said soil substantially completely covering said cedar.

5. A litter potentiating agent as defined in claim 4 wherein the cedar is within the mesh size range of approximately 2 to 16.

6. The method of enhancing the effectiveness of absorbent soil as an animal litter comprising providing a stratum of natural, untreated cedar in particulate form upon a suitable receptacle, and distributing coveringly upon said cedar stratum an overlying discrete stratum of absorbent soil from the class consisting of diatomaceous earth and clay, said soil and said cedar being unmixed and unbound, said cedar being of such particulate character as to militate against the development of air pockets therein, and said soil substantially completely covering said cedar.

7. The method defined in claim 6 wherein the cedar is of particulate form being within the mesh size range of approximately 2 to 16, the depth of said cedar bed being no less than approximately ¼".

8. The method as defined in claim 7 wherein the depth of the stratum of absorbent soil is within the range of approximately 1½" to 3½".

* * * * *